Figure 1:
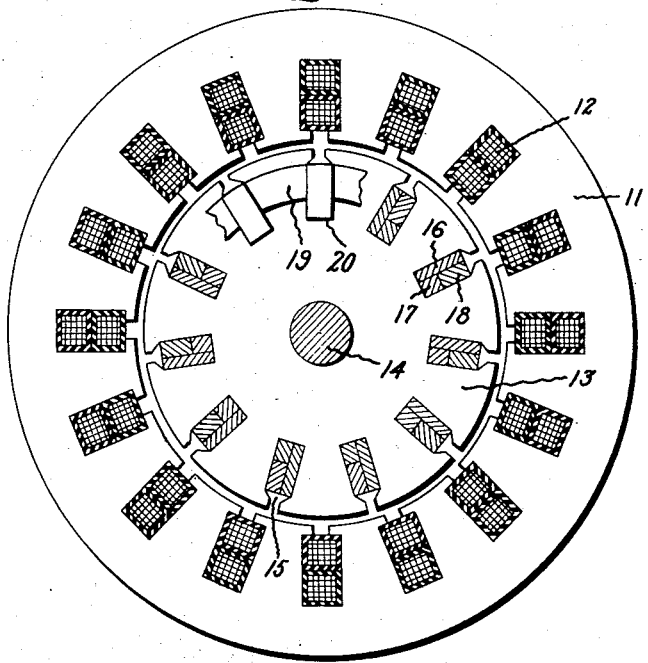

Feb. 24, 1925.

P. L. ALGER 1,527,660

INDUCTION MOTOR

Filed Aug. 4, 1921

Inventor:
Philip L. Alger,
by His Attorney.

Patented Feb. 24, 1925.

1,527,660

UNITED STATES PATENT OFFICE.

PHILIP L. ALGER, OF SCHENECTADY, NEW YORK, ASSIGNOR TO GENERAL ELECTRIC COMPANY, A CORPORATION OF NEW YORK.

INDUCTION MOTOR.

Application filed August 4, 1921. Serial No. 489,863.

*To all whom it may concern:*

Be it known that I, PHILIP L. ALGER, a citizen of the United States, residing at Schenectady, in the county of Schenectady, State of New York, have invented certain new and useful Improvements in Induction Motors, of which the following is a specification.

This invention relates to an induction motor, and more particularly to a secondary member used in an induction motor and adapted to start and accelerate without any switching devices in the secondary circuit.

In many cases the utmost simplicity is desired for the starting and operation of induction motors. This simplicity may be obtained by the use of a squirrel cage rotor for the secondary member of the motor, since then insulated phase windings and slip rings are done away with. It has been difficult, however, to design such a motor having desirable characteristics both for starting and for normal operation. Especially are these needed where the motor must be started with a load using a high torque during the starting period. Ordinarily the starting current is abnormally high and the starting torque low for a squirrel cage motor although the running characteristics may be very fair. It is the main object of my invention to produce a motor having desirable starting characteristics as well as desirable running characteristics. Thus, with the aid of my invention it is possible to obtain a high starting torque with a comparatively low starting current without auxiliary switching apparatus.

I am aware that double squirrel cage windings have been used and are being used to a great extent for obtaining good starting characteristics as well as running characteristics, but in all of the forms of which I am aware the starting current is still too high or the starting torque low for the most desirable operation, or there are mechanical difficulties. With my invention, I use a single squirrel cage but I make the cross section of the conductors of the proper shape so that the desirable characteristics referred to hereinbefore are secured. Due to the fact that but a single squirrel cage is used, the secondary member may be inexpensively constructed. The conductors forming the squirrel cage are each laid in appropriately formed slots in the core structure of the secondary member. Each of the conductors has a relatively narrow portion and a relatively wide portion. Due to the fact that the narrow portion of the conductor extends to a considerable distance within the core, eddy currents of appreciable amount are produced therein at the start. The apparent resistance of the conductor is thus increased, and a large starting torque is obtained. At the same time the relatively wide portion is so situated that it has a large reactance during the starting period and therefore the starting current is kept within reasonable limits. When up to speed, the motor behaves as an ordinary single squirrel cage motor.

Figure 2:
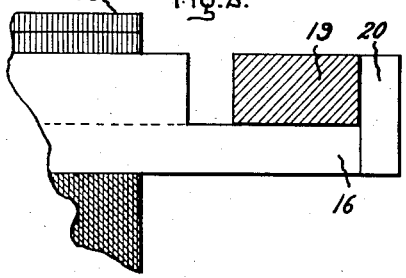

For a better understanding of my invention reference is had to the following specification together with the accompanying drawing in which Fig. 1 is a view partly in section, showing the secondary as well as the primary member of the induction motor built in accordance with my invention, and Fig. 2 is a fragmentary sectional view showing how the end rings are fastened to the conductors in the secondary member.

Referring now more in detail to the drawing in which like reference characters refer to like parts throughout, the stator 11 of the induction motor carries appropriate windings 12 in slots located in the stator. The construction of these stator windings forms no part of my present invention, since any well known form of stationary armature winding may be utilized. The secondary member 13, is mounted on the shaft 14 of the motor and comprises a core structure in which there are a plurality of slots 15. This core structure is preferably made of stampings or laminations. Within the slots are located the conductors forming the squirrel cage. In the present instance the conductors in each slot comprise the relatively narrow rectangular portion 16 made of copper or other good conducting material and the relatively wide rectangular portion 17 also made of copper or other good conducting material. However, it is evident that I may make use of other shapes so long as there is an abrupt change in width in passing from one portion to the other. For ease in manufacture I preferably make the slots of the ordinary shape; that is, the slots form a rectangle. I fill in the unused portion of the rectangle by an iron bar 18.

This forms no essential part of the conductors but is only an expedient way of completing the magnetic structure of the core, and of imbedding portion 17 of the conductor so that its self induction is rendered comparatively large.

The bars 16 and 17 extend beyond the ends of the core member 13 as shown in Fig. 2 and are connected to an end ring 19 as by welding the end ring and the conductor to a strip of conducting material 20. This is quite the usual form of end ring construction and is the same as that used in single squirrel cage motors, except that the end ring is preferably placed radially outside of the bars instead of inside.

While I have shown only one embodiment of my invention, I do not wish to be limited thereto, but aim to embrace in the appended claims all modifications falling fairly within the spirit and scope of my invention.

What I claim as new and desire to secure by Letters Patent of the United States, is:—

1. A secondary member for dynamo electric machine comprising a core structure provided with partially closed rectangular slots, a squirrel cage winding in said slots, the cross section of the winding in each slot being L shaped, and bars of magnetic material permanently filling up the remaining space in said slots.

2. A secondary member for a dynamo electric machine comprising a core structure provided with partially closed substantially rectangular slots, a squirrel cage winding in said slots, the cross section of the winding in each slot being such as to leave a portion of the slot un-filled, and a bar of magnetic material permanently filling the remaining portion of each of said slots.

In witness whereof, I have hereunto set my hand this 3rd day of August, 1921.

PHILIP L. ALGER.